United States Patent
Mehta et al.

(10) Patent No.: US 8,484,636 B2
(45) Date of Patent: Jul. 9, 2013

(54) GENERATING APPLICATION RECOMMENDATIONS BASED ON USER INSTALLED APPLICATIONS

(75) Inventors: Bhaskar Mehta, Adliswil (CH); Ihar Mahaniok, Zurich (CH); Istvan T. Hernadvolgyi, Adliswil (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/530,204

(22) Filed: Jun. 22, 2012

(65) Prior Publication Data
US 2012/0291022 A1    Nov. 15, 2012

Related U.S. Application Data

(63) Continuation of application No. PCT/US2012/037100, filed on May 9, 2012.

(60) Provisional application No. 61/484,143, filed on May 9, 2011.

(51) Int. Cl.
*G06F 9/445* (2006.01)

(52) U.S. Cl.
USPC ............................................. 717/176

(58) Field of Classification Search
None
See application file for complete search history.

(56) References Cited

U.S. PATENT DOCUMENTS

| | | | |
|---|---|---|---|
| 4,977,598 A * | 12/1990 | Doddington et al. | 704/255 |
| 6,185,543 B1 | 2/2001 | Galperin et al. | |
| 6,675,382 B1 * | 1/2004 | Foster | 717/177 |
| 6,925,649 B2 | 8/2005 | Schwalb et al. | |
| 7,073,190 B1 | 7/2006 | Malaure et al. | |
| 7,113,917 B2 | 9/2006 | Jacobi et al. | |
| 7,130,734 B2 | 10/2006 | Sah et al. | |
| 7,523,099 B1 | 4/2009 | Egnor et al. | |
| 7,555,459 B2 | 6/2009 | Dhar et al. | |
| 7,594,006 B2 | 9/2009 | Rolia et al. | |
| 7,644,013 B2 | 1/2010 | Nastacio et al. | |

(Continued)

FOREIGN PATENT DOCUMENTS

| | | |
|---|---|---|
| EP | 2230605 A1 | 9/2010 |
| US | RE42357 E1 | 5/2011 |

(Continued)

OTHER PUBLICATIONS

Authorized Officer Blaine R. Copenheaver, International Search Report and Written Opinion in International Application No. PCT/US2012/037122, dated Jan. 4, 2013, 12 pages.

(Continued)

*Primary Examiner* — Wei Zhen
*Assistant Examiner* — Larry Ung
(74) *Attorney, Agent, or Firm* — Fish & Richardson P.C.

(57) ABSTRACT

Methods, systems and apparatus, including computer programs encoded on a computer storage medium, for receiving an application installation log, the application installation log including per-user installation data indicating when each of a plurality of applications available through an application marketplace was installed on a plurality of computing devices, determining an overall score corresponding to a first application and a second application, the score indicating a degree of overlap in installation periods of the first application and the second application on the plurality of computing devices, determining that the overall score is greater than or equal to a threshold score, generating an index, the index associating the second application as an application of interest in view of the first application, and storing the index in computer-readable memory.

20 Claims, 6 Drawing Sheets

U.S. PATENT DOCUMENTS

| | | |
|---|---|---|
| 7,685,012 B2 | 3/2010 | Wilson |
| 7,792,685 B2 | 9/2010 | Andino et al. |
| 7,831,695 B1 | 11/2010 | Burr et al. |
| 7,890,870 B1 | 2/2011 | Metters et al. |
| 7,945,545 B1 | 5/2011 | Sorkin et al. |
| 8,169,481 B2 | 5/2012 | Ozdemir et al. |
| 8,175,802 B2 | 5/2012 | Forstall et al. |
| 8,245,239 B2 | 8/2012 | Garyali et al. |
| 2002/0063735 A1 | 5/2002 | Tamir et al. |
| 2002/0144261 A1 | 10/2002 | Schwalb et al. |
| 2002/0152200 A1* | 10/2002 | Krichilsky et al. ............ 707/3 |
| 2002/0194096 A1 | 12/2002 | Falcone et al. |
| 2003/0192029 A1 | 10/2003 | Hughes |
| 2004/0093595 A1 | 5/2004 | Bilange |
| 2004/0143508 A1 | 7/2004 | Bohn et al. |
| 2005/0091094 A1 | 4/2005 | Wilson |
| 2005/0120113 A1 | 6/2005 | Bunch et al. |
| 2005/0240668 A1 | 10/2005 | Rolia et al. |
| 2006/0031248 A1 | 2/2006 | Vinberg et al. |
| 2006/0271618 A1 | 11/2006 | Kokubo et al. |
| 2007/0208583 A1 | 9/2007 | Ward |
| 2007/0233782 A1 | 10/2007 | Tali |
| 2009/0163183 A1 | 6/2009 | O Donoghue et al. |
| 2009/0276332 A1 | 11/2009 | Gharabally et al. |
| 2010/0011352 A1 | 1/2010 | Chu et al. |
| 2010/0042616 A1 | 2/2010 | Rinearson |
| 2010/0058468 A1 | 3/2010 | Green et al. |
| 2010/0076849 A1 | 3/2010 | Bishop |
| 2010/0146442 A1 | 6/2010 | Nagasaka et al. |
| 2010/0250337 A1 | 9/2010 | Kassaei |
| 2010/0262467 A1 | 10/2010 | Barnhill et al. |
| 2010/0262619 A1 | 10/2010 | Zargahi et al. |
| 2010/0280892 A1 | 11/2010 | Uzunalioglu et al. |
| 2010/0306191 A1 | 12/2010 | LeBeau et al. |
| 2010/0306762 A1 | 12/2010 | Lindberg et al. |
| 2010/0312817 A1 | 12/2010 | Steakley |
| 2011/0077951 A1 | 3/2011 | Tullis |
| 2011/0087975 A1 | 4/2011 | Karsten |
| 2011/0105150 A1 | 5/2011 | Moon et al. |
| 2011/0106775 A1 | 5/2011 | Arbo et al. |
| 2011/0145920 A1 | 6/2011 | Mahaffey et al. |
| 2011/0167117 A1 | 7/2011 | Hart et al. |
| 2011/0307354 A1* | 12/2011 | Erman et al. ............ 705/27.1 |
| 2011/0320307 A1 | 12/2011 | Mehta et al. |
| 2012/0072283 A1* | 3/2012 | DeVore et al. ............ 705/14.49 |
| 2012/0290441 A1 | 11/2012 | Mahaniok et al. |
| 2012/0290583 A1 | 11/2012 | Mahaniok et al. |
| 2012/0290584 A1 | 11/2012 | De Bona et al. |
| 2012/0316955 A1 | 12/2012 | Panguluri et al. |

FOREIGN PATENT DOCUMENTS

| | | |
|---|---|---|
| WO | WO2012154838 A2 | 11/2012 |
| WO | WO2012154843 A1 | 11/2012 |
| WO | WO2012154848 A1 | 11/2012 |
| WO | WO2012154856 A1 | 11/2012 |

OTHER PUBLICATIONS

Authorized Officer D. Van Rijssel. International Search Report in International Application No. PCT/US2012/037129, dated Jul. 23, 2012, 9 pages.

Authorized Officer E. Sagno-Pabis. International Search Report in International Application No. PCT/US2012/037116, dated Jul. 11, 2012, 11 pages.

Authorized Officer D. Van Rijssel. International Search Report in International Application No. PCT/US2012/037109, dated Jul. 23, 2012, 9 pages.

Cutler; "Apple May have Tweaked App Store Ranking Algorithm, Making Downloads Matter Less," Apr. 18, 2011. [Retrieved on Jun. 29, 2012]. Retrieved from the Internet: URL: http://www.insidemobileapps.com/2011/04/18/apple-app-store-ranking-changes, 6 pages.

Peck, "What is the algorithm behind the App Store rankings," Oct. 27, 2010. [Retrieved on Jun. 29, 2012]. Retrieved from the Internet: URL: http://www.quora.com/What-is-the algorithm-behind-the-App-Store-rankings, 2 pages.

Ihar Mahaniok et al., U.S. Appl. No. 13/530,539, entitled "Using Application Metadata to Identify Applications of Interest," filed Jun. 22, 2012, 40 pages (including specification, claims, abstract and drawings).

Ihar Mahaniok et al., U.S. Appl. No. 13/530,242, entitled "Using Application Market Log Data to Identify Applications of Interest," filed Jun. 22, 2012, 39 pages (including specification, claims, abstract and drawings).

Fabio De Bona et al., U.S. Appl. No. 13/530,559, entitled "Recommending Applications for Mobile Devices Based on Installation Histories," filed Jun. 22, 2012, 30 pages (including specification, claims, abstract and drawings).

Authorized Officer Jung Soo Hwan, International Search Report and Written Opinion in International Application No. PCT/US2012/037100, dated Feb. 19, 2013, 11 pages.

* cited by examiner

GENERATING APPLICATION RECOMMENDATIONS BASED ON USER INSTALLED APPLICATIONS

CROSS-REFERENCE TO RELATED APPLICATIONS

This application is a continuation of, and claims priority to under 35 U.S.C. 120, International Application No. PCT/US2012/037100, filed May 9, 2012, which in turn claims the benefit of U.S. Prov. Pat. App. No. 61/484,143, filed May 9, 2011, the disclosures of which are expressly incorporated herein by reference in their entirety.

TECHNICAL FIELD

The present disclosure relates to suggesting one or more applications based on a selected application within an application marketplace.

BACKGROUND

Mobile computing devices (or simply "mobile devices") may run a variety of software applications that extend existing device capabilities and that add new capabilities. Many types of applications are generally available, such as applications for information retrieval, communications and entertainment. Applications may be created by mobile device manufacturers and/or third parties (e.g., application developers), and may be pre-installed by the manufacturer, or may be downloaded and installed by device users.

Users may discover new applications through an interface associated with an on-line application marketplace by browsing a catalog of available applications. Additionally, information about new applications is generally available through advertising, industry reviews, "top 10" and "best" lists, and through word-of-mouth referrals. Upon learning of a new application, users may obtain, install, and use full versions of the applications, or user may access demonstration versions of the application that allow the user to try the application out with or without purchasing. Over time, users may keep applications, upgrade applications (e.g., from a demonstration version to a full version), and may delete applications that are no longer wanted.

SUMMARY

Innovative aspects of the subject matter described in this specification may be embodied in methods that include the actions of receiving an application installation log, the application installation log including per-user installation data indicating when each of a plurality of applications available through an application marketplace was installed on a plurality of computing devices, for each first application and second application of the plurality of applications, determining an overall score corresponding to a first application and a second application, the score indicating a degree of overlap in installation periods of the first application and the second application on the plurality of computing devices, determining that the overall score is greater than or equal to a threshold score, generating an index, the index associating the second application as an application of interest in view of the first application, storing the index in computer-readable memory, receiving a user selection of a particular application of the plurality of applications, retrieving one or more applications of interest based on the particular application using the generated index, and providing the one or more applications of interest for display.

Other embodiments of these aspects include corresponding systems, apparatus, and computer programs, configured to perform the actions of the methods, encoded on computer storage devices.

These and other embodiments may each optionally include one or more of the following features. For instance, determining the overall score includes: calculating a total user score across a plurality of users, and calculating the overall score based on the total user score; the actions further include calculating a probability based on the total user score and a popularity of the second application, wherein the overall score is calculated based on the probability; the popularity of the second application is determined based on a number of installations of the second application on the plurality of computing devices; determining the overall score further includes: determining a group of users that installed both the first application and the second application, for each user in the group of users, calculating a per-user score to provide a plurality of per-user scores, and calculating the total user score as a sum of the plurality of per-user scores; each per-user score is determined based on first timestamps associated with the first application and second timestamps associated with the second application; calculating a per-user score to provide a plurality of per-user scores includes: determining, for a particular user, that an installation period of the second application is less than a threshold installation period, and setting the per-user score for the particular user to zero in response to determining that the installation period of the second application is less than the threshold installation period; calculating a per-user score to provide a plurality of per-user scores includes: determining, for a particular user, that the second application was installed within a threshold period after installation of the first application, and in response to determining that the second application was installed within the threshold period after installation of the first application, calculating the per-user score for the particular user based on respective install timestamps of the first and second applications; the per-user score for the particular user is calculated further based on an uninstall timestamp of the first application; calculating a per-user score to provide a plurality of per-user scores further includes: determining that the second application was installed before the first application was uninstalled, determining that the second application was installed after the first application was installed, and in response to determining that the second application was installed before the first application was uninstalled and determining that the second application was installed after the first application was installed, incrementing the per-user score for the particular user; calculating a per-user score to provide a plurality of per-user scores includes: determining, for a particular user, that the second application was not installed within a threshold period after installation of the first application, determining, for the particular user, that a difference between an installation time of the first application and an installation time of the second application is less than a threshold difference, and in response to determining that the second application was not installed within a threshold period after installation of the first application and determining that the difference between an installation time of the first application and an installation time of the second application is less than the threshold difference, setting the per-user score for the particular user to one; the actions further include: determining a second overall score corresponding to the first application and a third application, the second overall score indicating a degree of overlap in installation periods of the first application and the third application on a plurality of computing devices, and determining that the second overall score is less than a threshold score, wherein the third application is absent from the index as an application of interest in view of the first application in response to determining that the second overall score is less than the threshold score; the actions further include: receiving a search query, generating search results based on the search query, the search results corresponding to the plurality of applications, and transmitting the search results for display to a user; and the actions further include: receiving user input, the user input indicating a selection of a search result from the search results, the search result corresponding to an application of the plurality of applications, in response to receiving the user input, accessing the index to identify at least one application of interest that is deemed to be potentially of interest to users in view of the application, and transmitting information corresponding to the application and the at least one application of interest for display to the user.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes systems and methods for identifying one or more applications as suggested applications in view of a selected application within an application marketplace. In some implementations, users of computing devices (e.g., mobile computing devices) can search for executable applications in an application marketplace and can download and install these applications on the computing device. However, the users may often find it cumbersome to search through the application marketplace to discover other applications that can be relevant to a selected application.

In some implementations, a user can search for applications that are available through the application marketplace by entering search terms into a query field provided in a user interface of the application marketplace. A resultant query can be transmitted to the application marketplace, which searches available applications to identify one or more applications that correspond to the query. The application marketplace can return a list of the one or more applications to the computing device. The user can select an application from the list displayed on the computing device. In response to the user selection, detailed information regarding the selected application can be presented to the user via the computing device. Further, a list of one or more suggested applications can also be displayed to the user in response to the user selection. A suggested application can include an application that is deemed to be relevant to the selected application, such as an application that is considered to be an accessory to the selected application.

By way of non-limiting example, the selected application can include a touchscreen keyboard application that can be downloaded to and executed on the user's computing device to provide an after-market keyboard (e.g., a specialized keyboard, a stylized keyboard). Continuing with the non-limiting example, an example suggested application can include a so-called "skins" application that can be downloaded to and executed on the user's computing device to customize the appearance of the touchscreen keyboard (e.g., stylize the keyboard to include various colors, designs, motifs, etc.). Another example suggested application can include an emoticon application that can be downloaded to and executed on the user's computing device to customize the functionality of the touchscreen keyboard by adding keys corresponding to one or more emoticons. Emoticons can include graphics that can be used to provide a visual expression.

Information relating to the search queries, the selection of the applications for display of detailed information, application installations, application content, application ratings and the like can be stored in a database. The information can account for the search queries, requests for detailed information and application installations of multiple users across multiple devices. As discussed in further detail below, installation and application information can be processed to identify one or more applications as suggested applications for a particular application. Suggested applications can be displayed in the application marketplace as being suggested in view of a selected application.

Figure 1:
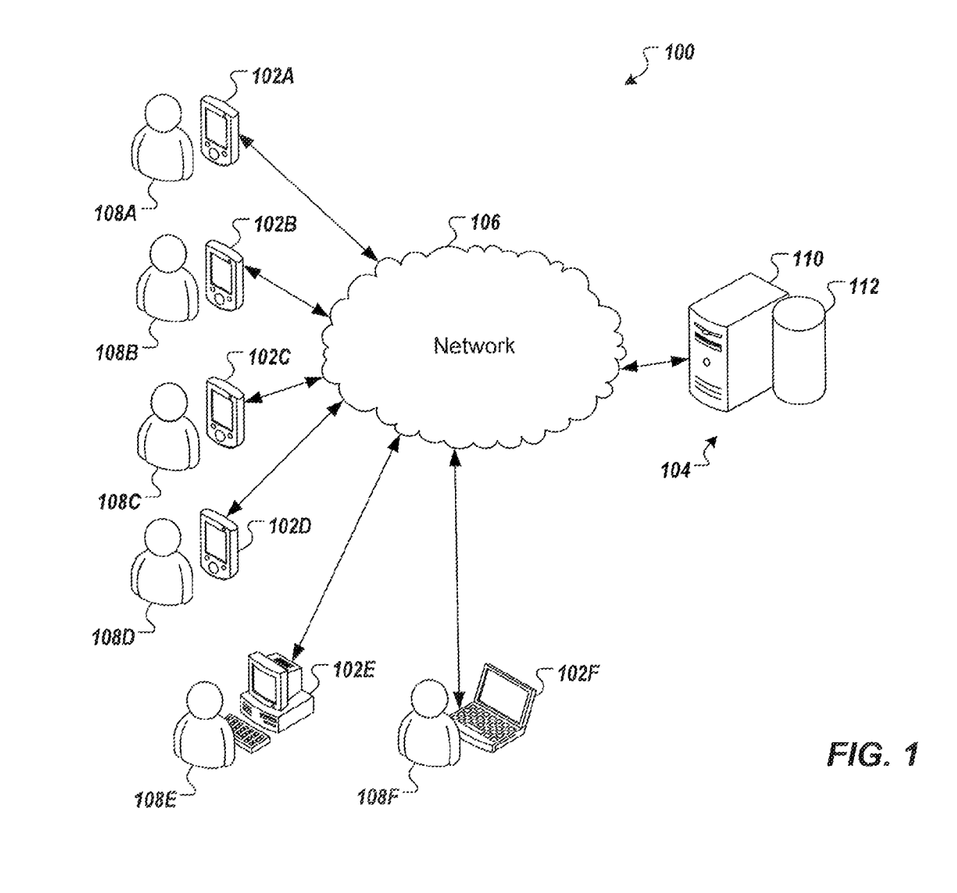
FIG. 1 depicts an example system that can execute implementations of the present disclosure.

FIG. 1 is a diagram of an example system 100 that can execute implementations of the present disclosure. The system 100 includes computing devices 102A-102F that can each communicate with a server system 104 over a network 106. Each of the computing devices 102A-102F includes an associated user 108A-108F, respectively. The network 106 can include a large computer network, such as a local area network (LAN), a wide area network (WAN), the Internet, a cellular network, or a combination thereof connecting any number of mobile computing devices, fixed computing devices and server systems. The server system 104 includes one or more computing devices 110 and one or more machine-readable repositories, or databases 112.

In the example system 100, the computing devices 102A-102D are illustrated as mobile computing devices, the computing device 102E is illustrated as a desktop-type computing device and the computing device 102F is illustrated as a laptop-type computing device. It is appreciated, however, that the computing devices 102A-102F can each include any type of computing device such as a desktop computer, a laptop computer, a handheld computer, a personal digital assistant (PDA), a cellular telephone, a tablet, a network appliance, a camera, a smart phone, an enhanced general packet radio service (EGPRS) mobile phone, a media player, a navigation device, an email device, a game console, or a combination of any two or more of these data processing devices or other data processing devices.

The computing devices 102A-102F enable the respective users 108A-108F to interact with an application marketplace. An example application marketplace includes Google Play (formerly known as the Android Market) provided by Google Inc. In some implementations, the application marketplace can include a website that is hosted on one or more servers (e.g., the server system 104) and that is accessed using a computing device (e.g., computing devices 102A-102F). In some implementations, the application marketplace can be provided as an application that is executed on a computing device (e.g., computing devices 102A-102F), and that retrieves application information from one or more servers (e.g., the server system 104).

The application marketplace can advertise applications that are available for download to and installation on one or more of the computing devices 102A-102F. For example, the user 108A of the computing device 102A can interact with the application marketplace to view and/or find applications of interest. For example, the user 102A can input a search query to the application marketplace. The search query can be processed (e.g., by one or more server systems hosting, or otherwise providing data to the application marketplace) to identify one or more applications corresponding to the search query. Information corresponding to the one or more applications can be transmitted to the computing device 102A for display to the user 108A. As another example, the application marketplace can display categories of applications (e.g., most recent applications, most downloaded applications, top free applications, top paid applications, featured applications, entertainment, productivity, business, education and the like). In response to selecting a particular category, information corresponding to one or more applications within the particular category can be transmitted to the computing device 102A for display to the user 108A.

Continuing with the example above, the user 108A can select a particular application from the one or more displayed applications to view further detail about the application and/or to download and install the application to the computing device 102A. For example, in response to user input, further detail regarding a selected application can be displayed. Examples of further detail can include a description of the application, user ratings of the application, user reviews, application screenshots, as well as other applications that are suggested in view of the selected application. As discussed in further detail herein, implementations of the present disclosure are directed to determining applications to suggest in view of a selected application.

Figure 2:
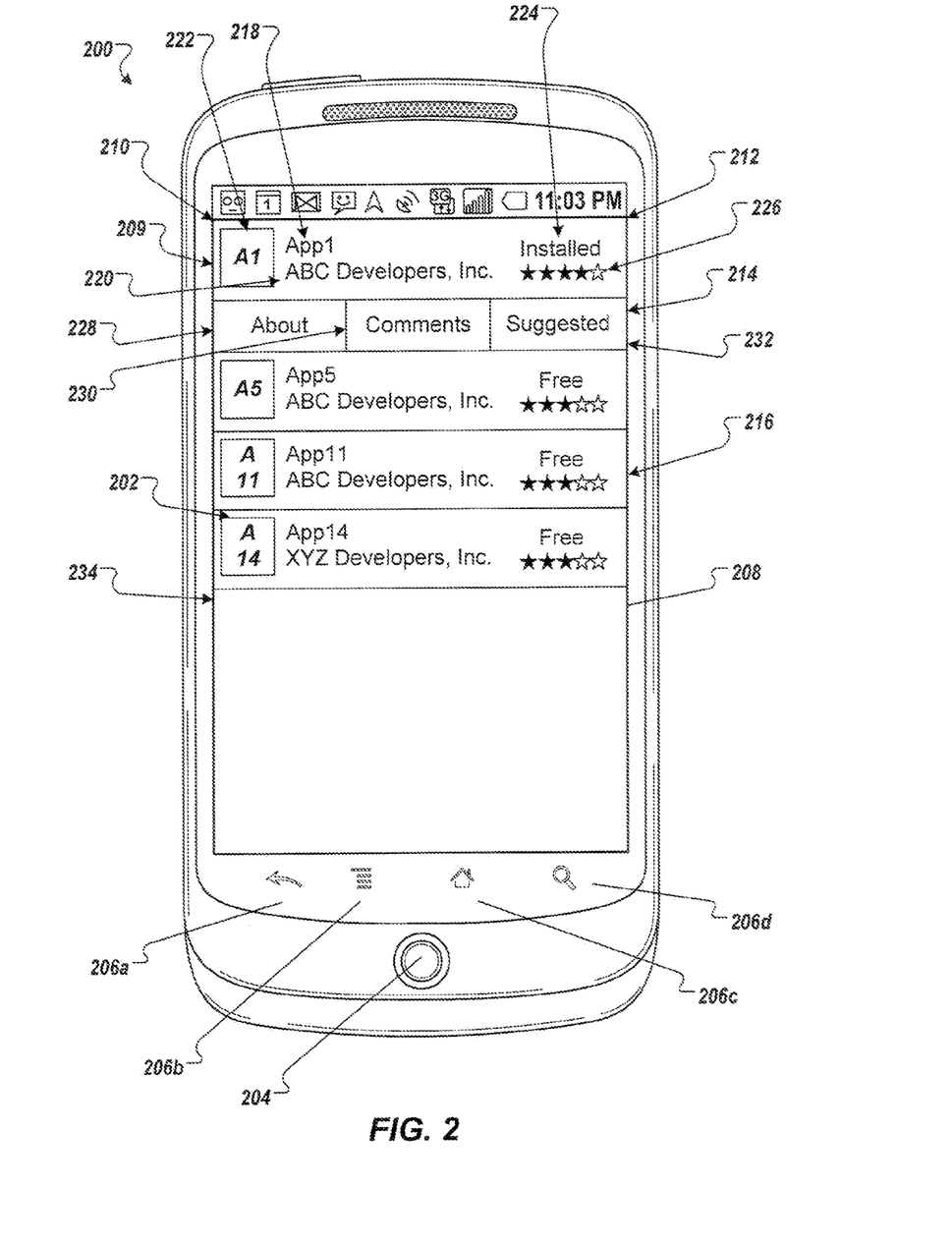
FIG. 2 depicts an example mobile device for displaying applications identified as being related to a selected application.

FIG. 2 depicts an example mobile device 200 for displaying suggested applications in view of a selected application. The mobile device 200 can correspond to the computing devices 102A-102D of FIG. 1. The mobile device 200 includes a display 202, a trackball 204 and navigations buttons 206a-206d. The display 202 can display a graphical user interface (GUI) 208. The GUI 208 provides an interface for a user (e.g., the users 108A-108D) to interact with an operating system and applications stored in a memory of the mobile device 200. An example operating system includes the Android Operating System provided by Google Inc. The user can interact with the GUI 208 to navigate a listing of the applications stored in memory of and executable on the mobile device 200, select an application for execution by a processor of the mobile device 200, provide input to the applications during execution of the application, and the like.

The user of the mobile device 200 navigates the GUI 208 via the display 202, the trackball 204 and navigations buttons 206a-206d, and/or other input means (e.g., acoustic and/or tactile). In some implementations, the display 202 is a touchscreen display. The trackball 204 controls a cursor that can be part of the GUI 208 for selecting items displayed on the GUI 208. The navigations buttons 206a-206d have various implementations dependent upon the specific operating system stored on the mobile device 200. In some implementations, the navigation button 206a provides a "previous" function that returns the current state of the GUI 208 to a previous state of the GUI 208; the navigation button 206b provides a menu function; the navigation button 206c provides a home function that brings the GUI 208 to a "home screen;" and the navigation button 206d provides a searching function.

The mobile device 200 stores an application marketplace application. The application marketplace application can be provided as a client-side application that enables communication with an application marketplace that is provided as a back-end application (e.g., executed on one or more server systems). The application marketplace application provides a listing of applications to the user that are available for download to and installation on the mobile device 200. Specifically, the user selects the application marketplace application by navigating the GUI 208. The user can select the application marketplace application (e.g. launch the application marketplace application for execution) by any means provided by the operating system stored on the mobile device 200. Upon the user selecting the application marketplace application, the application marketplace application can display a query field in the GUI 208. The user can enter search terms into the query field to generate a query. The search terms can be related to a specific application the user wishes to obtain more information about, including possible installation of the application on the mobile device 200. In some implementations, the search terms relate to a specific application, such as search terms "Google Earth" relating to the Google Earth application. In some implementations, the search terms can be related to a category of applications that the user is interested in, such as the search terms including "Shopping" in which multiple applications can relate to the search terms. The multiple applications can include, among others, "Google Shopper" and "Amazon Mobile," for example.

After the user enters the search terms into the query field, the application marketplace application returns an updated interface to the GUI 208. Specifically, in response to the query, the GUI 208 can include a listing of applications as search results that are identified as corresponding to the search terms. The user can select an application from the search results. In response to the selection of a specific application, the application marketplace application provides an updated interface to the GUI 208 relating to the selected application 209. Specifically, the GUI 208 can include an application interface 210 including information specific to the selected application 209.

In some implementations, a listing of applications can be displayed by the GUI 208 in response to other user input and/or a default listing of applications can be presented. For example, upon selection of the application marketplace application on the mobile device 200, a welcome screen can be displayed, which includes a default listing of applications. The default listing of applications can include, for example, the top-most searched applications, or the top-most installed applications. Further, listings of applications can be displayed based on category. For example, the user can select a particular category (e.g., news, books, entertainment), and a listing of applications corresponding to the selected category can be displayed. An application can be selected from any listing of applications, or otherwise, however presented on the GUI 208.

The application interface 210 includes an application heading portion 212, a tabbed portion 214 and a content portion 216. The heading portion 212 includes summary information specific to the selected application 209. The application-specific information can include, for example, an application name 218, an application developer 220, an application icon 222, an install status 224 and a rating 226. The install status 224 includes information relating to whether the selected application 209 is currently installed on the mobile device 200. In some implementations, the rating 226 is a rating provided by the user of the mobile device 200 when the selected application 209 is currently installed or was previously installed on the mobile device 200. In some implementations, the rating 226 is a rating average provided by multiple users across multiple devices.

The tabbed portion 214 includes, for example, an about tab 228, a comments tab 230 and a suggested applications tab 232. When a tab of the tabbed portion 214 is selected by the user of the mobile device 200, contents related to the selected tab are displayed in the content portion 216. When selected, the about tab 228 displays content in the content portion 216 relating to a description about the selected application 209. The description is provided by a developer of the selected application 209. When selected, the comments tab 230 displays content in the content portion 216 relating to comments provided by other users who have previous experience with the selected application 209 on a respective mobile device. The comments can include text, audio, video and the like. Further, the comments can include a rating of the selected application 209.

When selected, the suggested applications tab 232 displays content in the content portion 216 related to a listing 234 of suggested applications in view of the selected application 209. Specifically, the suggested application tab 232 displays the listing 234 of suggested applications that have been identified as applications that should be displayed as suggestions for download and installation in view of the selected application 209, as detailed further below. The listing 234 can be provided as a scrollable list. The user of the mobile device 200 can scroll the listing 234 vertically such that the listing reveals additional suggested applications while hiding a portion of the currently displayed suggested applications. The listing 234 of suggested applications can include application-specific information for each suggested application such as an application name, an application developer, an application icon, a pricing and a rating. In some examples, after the user installs the selected application 209 on the mobile device 200, the application marketplace application returns an updated interface to the GUI 208 including the listing 234 of suggest applications (e.g., on a "thank you for downloading" user interface).

As discussed in further detail herein, for each application available in an application marketplace, one or more suggested applications can be identified based on application installation data. In some implementations, an installation log can provide application installation data on a per user basis. The installation data can include timestamps corresponding to when each application was installed by a user and, if uninstalled by the user, when each application was uninstalled by the user. The installation data can be processed to generate an index of suggested applications. The installation data can be anonymized so that no personally identifiable information can be determined for any user from the installation data.

In accordance with implementations of the present disclosure, a score can be defined between two applications (e.g., AppA and AppB) that is indicative of a degree to which AppB is an install candidate in view of AppA. The higher the score, the more often that the historical installation periods of AppA and AppB overlap and the longer AppB was installed based on the installation data. In some examples, accidental and noise data are not taken into account in determining the score. For example, and as discussed in further detail below, applications installed for only for a short time are not considered. The overall score is an aggregate score across all users (or a subset of all users) that have installed AppA and/or AppB. Examples of how the score is determined are discussed in detail herein. In some implementations, the score can be normalized based on the respective popularities of AppA and AppB. Examples of normalization are discussed in detail herein and can take the probability that the "trigger" application (e.g., AppA) is not installed while the recommendation candidate (e.g., AppB) is installed into account. The more likely that this happens, the less likely AppB is a candidate to AppA. In general, the more AppA is implied by AppB, the more likely AppB can be deemed to be an accessory to AppA.

Figure 3:
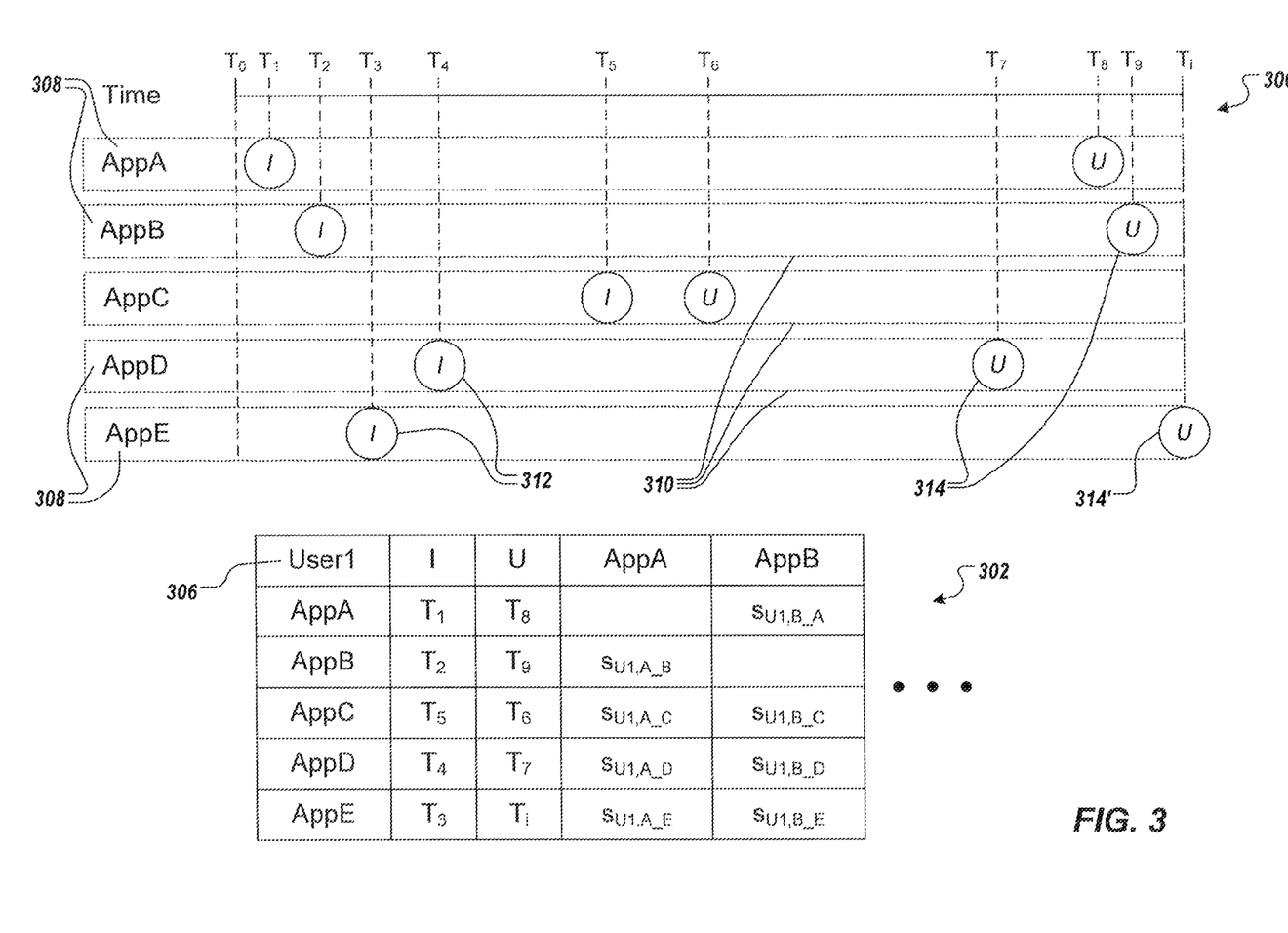
FIG. 3 depicts an application installation timeline and table summary for a particular user.

FIG. 3 depicts an application installation timeline 300 and a table 302 for a particular, anonymous user 306 (User1). The installation timeline 300 provides a historical summary of when the user 306 installed and uninstalled a series of applications 308 (AppA, AppB, AppC, AppD, AppE). The table 302 summarizes the installation histories for each of the applications 308 in tabular form. With regard to the installation timeline 300, and for each application 308, a timeline 310 is provided. Each timeline 310 includes an install timestamp 312 and an uninstall timestamp 314. For example, the user 306 installed AppA on a computing device at timestamp $T_1$ and uninstalled AppA from the computing device at timestamp $T_8$. As another example, the user 306 installed AppB on the computing device at timestamp $T_2$ and uninstalled AppB from the computing device at timestamp $T_9$.

In some cases, one or more applications may be installed on the computing device, but may have not yet been uninstalled from the computing device. Consequently, a true uninstall timestamp would not be available. In such cases, an artificial uninstall timestamp 314' can be provided. In some implementations, the artificial uninstall timestamp 314' can be set at a current timestamp $T_i$. The current timestamp $T_i$ can correspond to a time when the installation data is retrieved or otherwise accessed for processing from the installation log. For example, the user 306 installed AppE on the computing device at timestamp $T_3$. However, when the installation data is accessed at the timestamp $T_i$, AppE is still installed on the computing device. Consequently, the timeline 310 of AppE includes an artificial timestamp 314' at timestamp $T_i$.

In accordance with implementations of the present disclosure, the application installation data is processed on a per user basis to recognize patterns between installations and uninstallations of applications. In some implementations, the installation timestamps and uninstallation timestamps are processed for pattern recognition between applications. Example patterns can include short installs, overlap in installs, closeness in install timestamps and/or closeness in uninstall timestamps. With continued reference to FIG. 3, and by way of non-limiting example, the installation of AppA and AppB on the computing device of the user 306 overlap, AppB was installed shortly after AppA was installed, and AppB was uninstalled shortly after AppA was uninstalled. The installation overlap, as well as the closeness in time between the installs and the uninstalls of AppA and AppB can provide an indication of a per-user relationship between AppA and AppB (e.g., for the user 306). Compounding these patterns across a large number of users, as discussed in further detail below, can provide an indication of a universal relationship between AppA and AppB. As another example, the length of time between the installation and uninstallation of AppC on the computing device of the user 306 can indicate the lack of a relationship between AppA, for example, and AppC for at least the user 306. Compounding these patterns across a large number of users, as discussed in further detail below, can provide a stronger indication of a lack of a relationship between AppA and AppC. In some implementations, applications having too short of an installation history are removed from consideration.

In some instances, multiple versions of the same application can be installed to the computing device. For example, a first version of an application can be installed on the computing device and can subsequently be updated by installation of a second version of the application. Accordingly, the existence of multiple versions can be recognized and the respective installation histories can be merged. By way of non-limiting example the installation history of AppA can reveal that a first version of AppA was installed at the timestamp $T_1$ and that a second version of AppA was installed at a later timestamp. The installation history of AppA can further reveal that the second version of AppA was uninstalled at timestamp $T_8$. In this example, the installation data for the first and second versions can be merged, such that AppA includes the install timestamp $T_1$ and the uninstall timestamp $T_8$.

In some implementations, the above-described patterns are embodied in the form of a score that indicates a strength of a relationship between applications. As discussed in further detail herein, a score is generated on a per-user basis and indicates the strength of a relationship between a subject application (AppX) and a target application (AppY). For each particular application pair (i.e., subject application (AppX) and target application (AppY)), the scores across all users are totaled and normalized to provide an overall score per application pair. If the overall score is above a threshold overall score, the target application (AppY) can be identified as a suggested application for the subject application (AppX). For example, if the subject application (AppX) is selected by a user in an application marketplace, the target application (AppY) can be displayed as a suggested application.

Referring again to FIG. 3, and by way of non-limiting example, determination of an overall score for applications AppA and AppB will be described. In this non-limiting example, AppA is provided as the subject application (AppX) and AppB is provided as the target application (AppY). A corresponding overall score is calculated to determine whether AppB should be suggested if a user were to select AppA in an application marketplace.

For each user of the application marketplace, a score ($s_{Uj,X\_Y}$; where j is a user identifier) is determined based on timestamps. The timestamps can include an install timestamp and an uninstall timestamp for the subject application (AppX), $T_{XI}$ and $T_{XU}$, respectively, and an install timestamp and an uninstall timestamp for the target application (AppY), $T_{YI}$ and $T_{YU}$, respectively. For example, AppA, being the subject application, includes an install timestamp $T_{AI}$ ($T_1$ in FIG. 3) and an uninstall timestamp $T_{AU}$ ($T_8$ in FIG. 3), and AppB, being the target application, includes an install timestamp $T_{BI}$ ($T_2$ in FIG. 3) and an uninstall timestamp $T_{BU}$ ($T_9$ in FIG. 3). A score for the user 306 ($s_{U1\_A\_B}$) can be determined. It can be determined whether the time that AppB was installed on the computing device of the user 306 is less than a threshold time ($t_{THR}$). For example, if the difference ($t_{INST}$) between $T_{BU}$ and $T_{BI}$ (i.e., $T_{BU}-T_{BI}$) is less than $t_{THR}$, $S_{U1\_A\_B}$ is set equal to zero. In this manner, the influence of the installation history of the user 306 on the overall score (discussed below) is minimized with respect to a relationship between AppA and AppB.

If, however, $t_{INST}$ is greater than or equal to $t_{THR}$, $S_{U1\_A\_B}$ is determined based on $T_{AI}$, $T_{AU}$, $T_{BI}$ and $T_{BU}$. In some implementations, if $T_B$, is less than a first factor that is determined based on $T_{AI}$, $S_{U1\_A\_B}$ can be calculated using a pre-defined relationship. In some implementations, the factor can be calculated based on $T_{AI}$ and a weighting factor. In some implementations, the weighting factor can be provided as a constant. In some implementations, the pre-defined relationship can be provided as:

$$s_{Uj,X\_Y} = k_1 * MAX(1.0, (k_2 - (ABS(T_{YI} - T_{XI}))/(T_{XU} - T_{XI})))$$

where $k_1$ and $k_2$ are provided as constants. Accordingly, and continuing with the non-limiting example above, $S_{U1\_A\_B}$ can be calculated as:

$$s_{U1\_A\_B} = k_1 * MAX(1.0, (k_2 - (ABS(T_{BI} - T_{AI}))/(T_{AU} - T_{AI})))$$

which is a score indicating a strength of an asymmetric relationship between AppA and AppB based on the installation data of the particular user (i.e., User1). In some implementations, the score can be modified based on a comparison of install timestamps and uninstall timestamps. For example, if $T_{BI}$ is earlier than $T_{AU}$, and if $T_{BI}$ is later than $T_{AI}$, the score $s_{U1\_A\_B}$ can be incremented by a constant.

If, however, $T_{BI}$ is not less than the first factor, and if a difference between install timestamps (e.g., $ABS(T_{BI}-T_{AI})$) is less than a second factor, $s_{U1\_A\_B}$ can be set equal to a constant (e.g., 1.0). If $T_{BI}$ is not less than the first factor, and if a difference between install timestamps (e.g., $ABS(T_{B1}-T_{AI})$) is not less than the second factor, $s_{U1\_A\_B}$ can be set equal to zero.

For a given application pair (i.e., subject application (AppX) and target application (AppY)), the above scoring process can be repeated for all users that have installed both AppX and AppY at some point, which can include users anonymously identified as $User_1$ through $User_j$, where j is an anonymous user identifier. A total score ($S_{TOTAL,X\_Y}$) for AppX and AppY can be calculated based on the following relationship:

$$s_{TOTAL,X\_Y} = s_{U1,X\_Y} + \ldots + s_{Uj,X\_Y}$$

Continuing with the non-limiting example above, a total score ($S_{TOTAL,A\_B}$) for AppA and AppB can be calculated based on the following relationship:

$$s_{TOTAL,A\_B} = s_{U1,A\_B} + \ldots + s_{Uj,A\_B}$$

which is a score indicating a strength of an asymmetric relationship between AppA and AppB based on the installation data of all users that have installed AppA and AppB at some point.

In some implementations, a normalization process can be performed to normalize $S_{TOTAL,X\_Y}$ to provide an overall score ($os_{X\_Y}$). The normalization process can determine $os_{X\_Y}$ based on $s_{TOTAL,X\_Y}$ and one or more normalized scores. An example normalized score ($1-N_{!X\_Y}$) (e.g., dependence score) can be estimated based on the following example relationship:

$$1-N_{!X\_Y} = (1-(ps_Y - s_{TOTAL,X\_Y})/(ps_Y + k_3))$$

where $ps_Y$ is a popularity score corresponding to the target application (AppY) and $k_3$ is a constant. In some implementations, $ps_Y$ can be determined based on the number of times the target application (AppY) has been installed on user computing devices. Continuing with the non-limiting example above, $1-N_{!A\_B}$ for the subject application (AppA) and the target application (AppY) can be determined as:

$$1-N_{!A\_B} = (1-(ps_B - s_{TOTAL,A\_B})/(ps_B + k_3))$$

Another example probability can include the probability ($P_{X\_Y}$) that the subject application (AppX) is installed given that the target application (AppY) is also installed, and can be determined based on the following example relationship:

$$P_{X\_Y} = s_{TOTAL,X\_Y}/(ps_Y + k_3)$$

Continuing with the non-limiting example above, $P_{A\_B}$ can be determined as:

$$P_{A\_B} = s_{TOTAL,A\_B}/(ps_B + k_3)$$

Having determined $P_{!X\_Y}$ and $P_{X\_Y}$, $os_{X\_Y}$ can be determined based on the following example relationship:

$$os_{X\_Y} = k_4 * (1 - N_{X\_Y})^A * (P_{X\_Y})^B$$

where $k_4$ is a constant. In some examples, the values of A and B can be determined experimentally. Continuing with the non-limiting example above, $os_{A\_B}$ can be determined as:

$$os_{A\_B} = k_4 * (1 - N_{!A\_B})^A * (P_{A\_B})^B$$

In some implementations, $os_{X\_Y}$ can be determined based on the following example relationship:

$$oS_{X\_Y} = k_4 * (1 - N_{!X\_Y}) * P_{X\_Y} * s_{TOTAL,X\_Y}$$

For each application pair (i.e., subject application (AppX) and target application (AppY)), the overall score ($os_{X\_Y}$) can be compared to a threshold overall ($os_{THR}$) to determine whether the target application (AppY) should be suggested when the subject application (AppX) is selected. If $os_{X\_Y}$ is greater than or equal to $os_{THR}$, the relationship between AppX and AppY is strong enough to suggest AppY when AppX is selected. Consequently, AppY is added to an initial index of suggested applications as a suggested application in view of AppX. If $os_{X\_Y}$ is less than $os_{THR}$, the relationship between AppX and AppY is not strong enough to suggest AppY when AppX is selected. Consequently, AppY is not added to the initial index of suggested applications as a suggested application in view of AppX.

Continuing with the non-limiting example above, if $os_{A\_B}$ is greater than or equal to $os_{THR}$, the relationship between AppA and AppB is strong enough to suggest AppB when AppA is selected by a user in an application marketplace. Consequently, AppB is added to the initial index of suggested applications as a suggested application in view of AppA. This process is completed for various other application pairs, in which AppA is the subject application. Using the example applications of FIG. 3, the following overall scores can be determined: $os_{A\_B}$, $os_{A\_C}$, $os_{A\_D}$ and $os_{A\_E}$. Each of $os_{A\_B}$, $os_{A\_C}$, $os_{A\_D}$ and $os_{A\_E}$ can be compared to $os_{THR}$ to determine whether to include AppB, AppC, AppD and/or AppE in the initial index of suggested applications as a suggested application in view of AppA. An example resultant index of suggested applications can be provided as:

TABLE 1

Example Initial Index of Suggested Applications

| Selected Application | Suggested Applications |
|---|---|
| AppA | AppB, AppD, AppE, . . . |
| AppH | AppF, AppG, AppQ, . . . |
| AppL | . . . |

In some implementations, the suggested applications that are actually displayed to a user in an application marketplace can be based on the initial index of suggested applications. Using the example initial index of suggested applications as a non-limiting example, if the user selects AppA in the application marketplace, information corresponding to applications AppB, AppD and AppE may be displayed as suggested applications. In some implementations, the suggested applications can be displayed in ranked order based on the respective overall scores. For example, for the application pairs (AppA, AppB), (AppA, AppD), (AppA, AppE), the overall scores can be provided as $os_{A\_B}$, $os_{A\_D}$ and $os_{A\_E}$, respectively. The suggested application with the highest overall score is displayed highest in the ranked order and the suggested application with the lowest overall score is displayed lowest in the ranked order. In some implementations, the number of suggested applications that are to be displayed can be limited based on the respective overall scores. For example, the top (e.g., 3, 5, 10) suggested applications based on overall score are displayed.

In some implementations, the initial index of suggested applications can be processed using application metadata to generate a final index of suggested applications. The application metadata can include filter metadata that can be used to filter (e.g., remove) applications from the initial index of suggested applications, as described in detail below. The filter metadata of an application can be compared to the filter metadata of each corresponding suggested application. If the filter metadata of the applications corresponds, the suggested application remains in the list of related applications the final index of related applications. If the filter metadata of the applications does not correspond, the related application is removed from the list of suggested applications. Further, in some implementations, if the filter metadata is not above a threshold, described in detail below, the suggested application is removed from the list of suggested applications.

Filter metadata can include, for example, category metadata, content metadata, title metadata, description metadata, install metadata, rating metadata, locale metadata and developer score metadata. In some implementations, the category metadata of an application and each application in a corresponding list of suggested applications can be compared. If it is determined that the applications correspond to the same category (e.g., games, entertainment, educational), a suggested application remains in the list of suggested applications. If, however, it is determined that the applications do not correspond to the same category, the suggested application is removed from the list of suggested applications in the final index of suggested applications.

The content metadata can indicate particular content of an application. In some implementations, the application content can include adult content, for example. The content metadata of an application and each application in a corresponding list of suggested applications can be compared. If it is determined that the applications correspond to the same content (e.g., adult), a suggested application remains in the list of suggested applications. If, however, it is determined that the applications do not correspond to the same content, the suggested application is removed from the corresponding list of suggested applications. For example, the content metadata of an application can indicate that the application includes adult content, and the content metadata of a suggested application in the corresponding list of suggested applications can indicate that the suggested application does not include adult content. As a note, although an application marketplace can exclude applications including pornographic content, applications including content that may be deemed to be racy (e.g., applications including content related to lingerie, and/or content related to erotic novels) can still be available from the application marketplace. Continuing with the above example, a comparison of the content metadata of the applications reveals that the content of the applications is different (i.e., the application includes adult content and the suggested application does not include adult content). Consequently, the application and the suggested application are no longer deemed to be applications that are relevant to one another and the index is adjusted accordingly.

The title metadata of applications can be processed. The title metadata includes the title of the application that can be displayed to the user, for example, as application name 218 of FIG. 2. In some implementations, if it is determined that at least one of the applications includes an empty title (e.g., the title is blank), the applications are not maintained as applications that are relevant to one another. In some implementations, and if neither title is empty, a title similarity score can be generated based on the text of each of the titles. The title similarity score can be generated based on keywords that are common to each of the titles. In some implementations, the title similarity score can be compared to a threshold title similarity score. If the title similarity score is less than the threshold title similarity score, the applications are not maintained as applications that are relevant to one another.

The description metadata of applications can be processed. The description metadata includes information relating to a description of the application that can be displayed to the user. The description metadata can be provided by the developer of the application. In some implementations, if it is determined that at least one of the applications includes an empty description (e.g., the description is blank), the applications are not maintained as related applications.

The install metadata of applications can be processed. In some implementations, the install metadata includes the total number of installations of the application across multiple computing devices (e.g., computing devices 102). If it is determined that the number of installs of at least one of the applications in the corresponding list of suggested applications is below a minimum number of installs, the application is removed from the list of suggested applications. In some implementations, the install metadata includes an install ratio of the application. The install ratio is the number of uninstalls of the application per the number of installs of the application (e.g., after install of the application, the user uninstalls the application). In some implementations, if it is determined that the install ratio of at least one of the applications in the corresponding list of suggested applications is below a minimum install ratio, the application is removed from the list of suggested applications.

The rating metadata of applications can be processed. In some implementations, the rating metadata includes a number of ratings of the application. For example, the number of ratings is the total number of individual ratings associated with the application provided by users (e.g. the users 108) of the application. In some implementations, if it is determined that the total number of ratings of at least one of the applications in the corresponding list of suggested applications is below a minimum number of ratings, the application is removed from the list of suggested applications. In some implementations, the rating metadata includes the average rating of the application. The average rating of the application can be across any subset (or all) of users of the application. In some implementations, if it is determined that the average rating of at least one of the applications in the corresponding list of suggested applications is below a minimum average rating, the application is removed from the list of suggested applications.

The locale metadata of applications can be compared. The locale metadata indicates data relating to geographic regions where the application is supported. In some implementations, the locale can indicate a country where the application is supported, for example, China or the United States. In some implementations, the locale can indicate languages into which the application has been translated. For example, a given application can be provided in English and German. In some implementations, if the locale information of applications indicates an overlap, the applications can be maintained as applications that are relevant to one another. For example, if it is determined that the applications include a language overlap (e.g., both applications are provided in English) and/or a country overlap (e.g., both applications are available in the United States), the applications are deemed to correspond to the same locale and are maintained as applications that are relevant to one another. If, however, it is determined that the applications do not correspond to the same locale, the applications are not maintained as applications that are relevant to one another.

The developer score metadata of applications can be compared. The developer score can relate to a rating associated with the developer of the application. For example, the developer rating can be based on historical ratings of applications provided by the developer or an average rating of applications provided by the developer. In some implementations, if it is determined that the developer score of at least one of the applications is below a minimum score, the applications are no longer maintained as applications that are relevant to one another.

Continuing with the example initial index of suggested applications provided above, application metadata can be processed to generate a final index of suggested applications. By way of non-limiting example, applications AppB, AppD and AppE are initially identified as suggested applications in view of AppA. The application metadata of AppA can be compared to corresponding application metadata of AppB, AppD and AppE, as discussed above. If the application metadata does not sufficiently correspond, one or more of AppB, AppD and AppE may be removed from the final index of related applications. For example, the application metadata of AppA and AppD can be compared and it can be determined that AppA and AppD include different content, AppA and AppD belong to different categories, AppA and AppD correspond to different locals, the average rating of AppD is below a threshold average rating, and/or the number of ratings of AppD is below a threshold number of ratings. Consequently, AppD is removed and is not present in the final index of suggested applications. An example final index of suggested applications can be provided as:

TABLE 2

Example Final Index of Suggested Applications

| Selected Application | Suggested Applications |
|---|---|
| AppA | AppB, AppE, . . . |
| AppH | AppF, AppG, . . . |
| AppL | . . . |

In the example final index of suggested applications, AppD and AppQ have been removed as suggested applications for AppA and AppL, respectively, based on the metadata processing.

Figure 4:
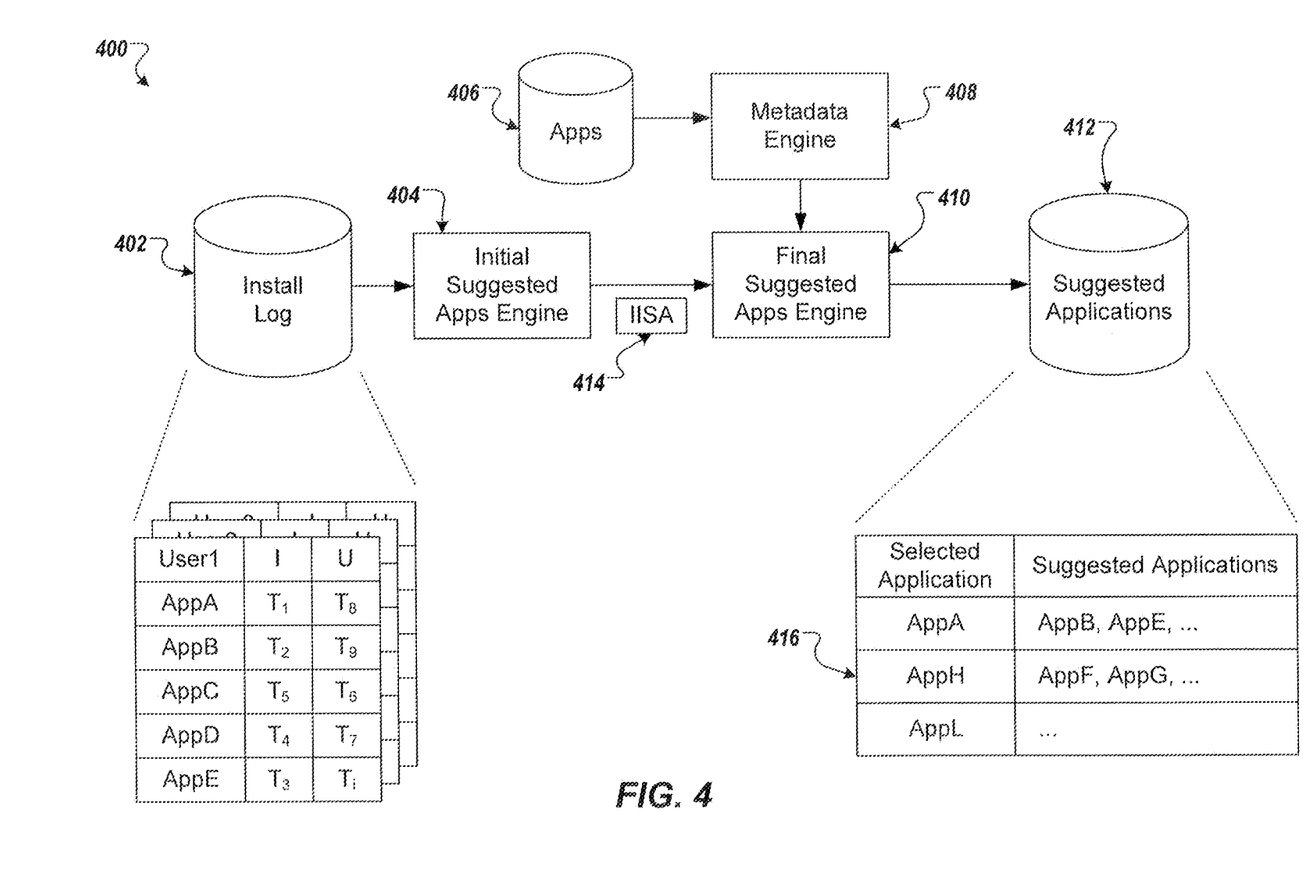
FIG. 4 is a block diagram of a system that includes example components for identifying applications for suggestion.

FIG. 4 is a block diagram of a system 400 that includes example components for identifying suggested applications and generating an index of suggested applications. The system 400 includes an install log database 402, an initial suggested applications engine 404, an application database 406, a metadata engine 408, a final suggested applications engine 410, and a related applications database 412. The components can be realized as one or more of computer-readable memory and a computer executable program that can be executed using one or more processors.

The install log database 402 provides the information to the initial suggested applications engine 404. The initial suggested application engine 404 processes the information from the install log database 402 to generate an initial index of suggested applications 414. As discussed above, the initial index of suggested applications includes, for each subject application, a list of target applications that are deemed to be sufficiently relevant to the subject application to be suggested. The initial suggested applications engine 404 processes the data provided in the install log to generate per user scores, cumulative scores and overall scores for various application pairs, as discussed in detail above. The initial suggested applications engine 404 generates the initial index of suggested applications 414 based on the overall scores.

The application database 406 stores information corresponding to the applications available for download to and installation on computing devices (e.g., the mobile device 200 of FIG. 2). The application database 406 provides information relating to the applications to the metadata engine 408. The metadata engine 408 processes this information to provide relevant metadata corresponding to each application. The metadata can include, for example, application name, developer name, rating, the price, category, whether an application is of a particular content (e.g., racy, religious), and the like. The metadata engine 408 provides the metadata of the applications to the final suggested applications engine 410.

The final suggested applications engine 410 receives the metadata from the metadata engine 408 and the initial index of suggested applications from the initial suggested applications engine 404. The final suggested applications engine 410 processes the initial index of suggested applications 414 based on the metadata to generate a final index of suggested applications 416, as discussed above. The final suggested applications engine 410 provides the final index of suggested applications 416 to the suggested applications database 412. The suggested applications database 412 stores the final index of suggested applications 416. The suggested applications database 412 makes the final index of suggested applications 416 available to the application marketplace.

Figure 5:
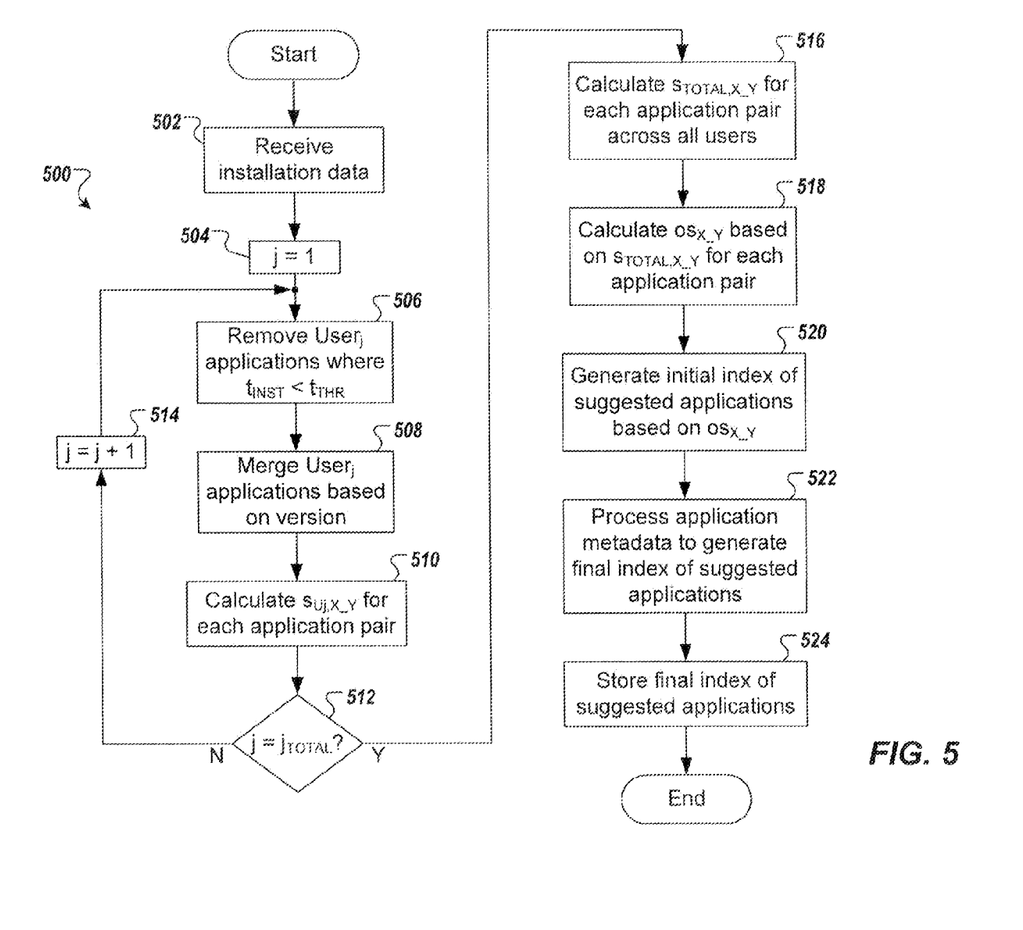
FIG. 5 is a flowchart of an example process that can be executed in accordance with implementations of the present disclosure.

FIG. 5 is a flowchart of an example process 500 that can be executed in accordance with implementations of the present disclosure. The example process 500 can be executed using one or more computing devices. For example, one or more server systems (e.g., the server system 104 of FIG. 1) can be used to execute the example process 500. The one or more computing devices can include and/or execute one or more components including the components of FIG. 4.

Installation data is received (502). For example, installation data can be requested and provided to one or more computing devices executing the initial suggested applications engine 404 of FIG. 4. A counter j is set equal to 1 (504). Installation data is processed on a per user basis, as discussed above. For example, $User_j$ applications that were installed for too short of a time period are removed from consideration (506). As another example, $User_j$ applications are merged based on application versions (508). The per-user score, $s_{Uj, X\_Y}$, is calculated for each application pair for the applications installed by $User_s$ (510). It is determined whether j is equal to $j_{TOTAL}$ (512). If j is not equal to $j_{TOTAL}$, scores have not yet been calculated for all users, the counter j is incremented by one (514) and the process 500 loops back.

If j is equal to $j_{TOTAL}$, scores have been calculated for all users, and $S_{TOTAL\_X\_Y}$ is calculated for each application pair across all users (516). The overall score, $os_{X\_Y}$, is calculated based on $S_{TOTAL\_X\_Y}$ for each application pair (518). An initial index of suggested applications is generated based on $os_{X\_Y}$ for each application pair (520). Application metadata is processed and a final index of suggested applications is generated based on the initial index of related applications (522). The final index of suggested applications is stored in computer-readable memory (524).

Figure 6:
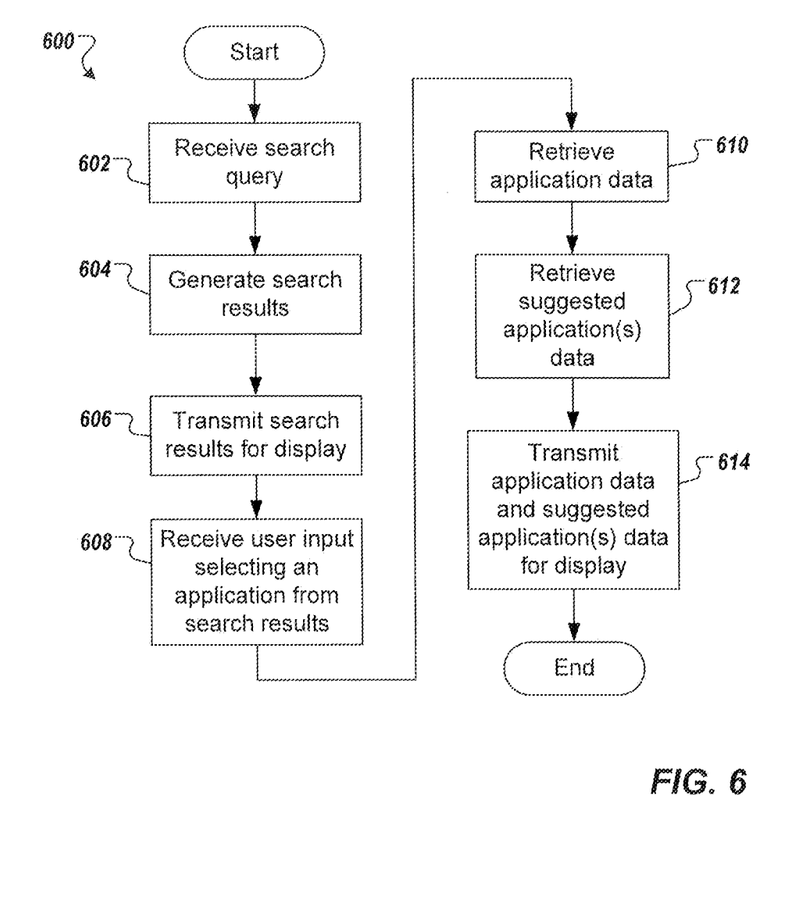
FIG. 6 is a flowchart illustrating an example process for displaying applications as suggested applications.

FIG. 6 is a flowchart illustrating an example process for displaying applications as suggested applications. The example process 600 can be executed using one or more computing devices. For example, one or more server systems (e.g., the server system 104 of FIG. 1) can be used to execute the example process 600.

A search query is received (602). The search query can include search terms related to a specific application or a category of applications. Search results are generated (604). The search results can include a listing of applications that are identified as corresponding to the search terms. The search results are transmitted for display (606). The search results can be displayed on a mobile computing device (e.g. the mobile computing device 200). User input is received indicating a selection of an application from the search results (608). Application data is retrieved (610). For example, the application data is retrieved in response to the user selection of the application. Suggested application(s) data is retrieved (612). The suggested application(s) data corresponds to applications deemed to be sufficiently relevant to the selected application. The suggested applications can be identified based on an index of suggested applications, using the selected application as an input. The application data and suggested application(s) data is transmitted for display (614). This data can be displayed on a mobile computing device (e.g. the mobile computing device 200).

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A system, comprising:
   one or more computers; and
   a computer-readable storage device coupled to the one or more computers having instructions stored thereon which, when executed by the one or more computers, cause the one or more computers to perform operations comprising:
       receiving an application installation log, the application installation log comprising per-user installation data indicating when each of a plurality of applications available through an application marketplace was installed on each computing device of a plurality of computing devices;
       for each application pair of the plurality of applications, each application pair including a first application and a second application:
           identifying a first installation period associated with the first application on the plurality of computing devices and a second installation period associated with the second application on the plurality of computing devices;
           determining a degree of overlap between the first installation period and the second installation period;
           determining an overall score corresponding to the application pair based on the degree of overlap;
           comparing the overall score with a threshold score;
           adding the application pair to an index when the overall score is greater than or equal to the threshold score, the index associating the second application as an application of interest in view of the first application;
           storing the index in computer-readable storage device;
       receiving a user selection of a particular application of the plurality of applications;
       retrieving one or more applications of interest based on the particular application using the index; and
       providing the one or more applications of interest for display.

2. The system of claim 1, wherein determining the overall score comprises:

calculating a total user score across a plurality of users; and
calculating the overall score based on the total user score.

3. The system of 2, wherein the operations further comprise calculating a probability based on the total user score and a popularity of the second application, wherein the overall score is calculated based on the probability.

4. The system of claim 3, wherein the popularity of the second application is determined based on a number of installations of the second application on the plurality of computing devices.

5. The system of claim 2, wherein determining the overall score further comprises:
   determining a group of users that installed both the first application and the second application;
   for each user in the group of users, calculating a per-user score to provide a plurality of per-user scores; and
   calculating the total user score as a sum of the plurality of per-user scores.

6. The system of claim 5, wherein each per-user score is determined based on first timestamps associated with the first application and second timestamps associated with the second application.

7. The system of claim 5, wherein calculating a per-user score to provide a plurality of per-user scores comprises:
   determining, for a particular user, that an installation period of the second application is less than a threshold installation period; and
   setting the per-user score for the particular user to zero in response to determining that the installation period of the second application is less than the threshold installation period.

8. The system of claim 5, wherein calculating a per-user score to provide a plurality of per-user scores comprises:
   determining, for a particular user, that the second application was installed within a threshold period after installation of the first application; and
   in response to determining that the second application was installed within the threshold period after installation of the first application, calculating the per-user score for the particular user based on respective install timestamps of the first and second applications.

9. The system of claim 8, wherein the per-user score for the particular user is calculated further based on an uninstall timestamp of the first application.

10. The system of claim 8, wherein calculating a per-user score to provide a plurality of per-user scores further comprises:
    determining that the second application was installed before the first application was uninstalled;
    determining that the second application was installed after the first application was installed; and
    in response to determining that the second application was installed before the first application was uninstalled and determining that the second application was installed after the first application was installed, incrementing the per-user score for the particular user.

11. The system of claim 5, wherein calculating a per-user score to provide a plurality of per-user scores comprises:
    determining, for a particular user, that the second application was not installed within a threshold period after installation of the first application;
    determining, for the particular user, that a difference between an installation time of the first application and an installation time of the second application is less than a threshold difference; and
    in response to determining that the second application was not installed within a threshold period after installation of the first application and determining that the difference between an installation time of the first application and an installation time of the second application is less than the threshold difference, setting the per-user score for the particular user to one.

12. The system of claim 1, wherein the operations further comprise:
    determining a second overall score corresponding to the first application and a third application, the second overall score indicating a degree of overlap in installation periods of the first application and the third application on a plurality of computing devices; and
    determining that the second overall score is less than a threshold score, wherein the third application is absent from the index as an application of interest in view of the first application in response to determining that the second overall score is less than the threshold score.

13. The system of claim 1, wherein the operations further comprise:
    receiving a search query;
    generating search results based on the search query, the search results corresponding to the plurality of applications; and
    transmitting the search results for display to a user.

14. The system of claim 13, wherein the operations further comprise:
    receiving user input, the user input indicating a selection of a search result from the search results, the search result corresponding to an application of the plurality of applications;
    in response to receiving the user input, accessing the index to identify at least one application of interest that is deemed to be potentially of interest to users in view of the application; and
    transmitting information corresponding to the application and the at least one application of interest for display to the user.

15. A computer-readable hardware storage device encoded with a computer program, the program comprising instructions that when executed by one or more computers cause the one or more computers to perform operations comprising:
    receiving a user selection of a particular application of a plurality of applications;
    retrieving one or more applications of interest based on the particular application using an index, the index associating, for each first application and second application of an application pair of the plurality of applications, the second application as an application of interest in view of the first application when an overall score corresponding to the application pair is greater than or equal to a threshold score, the overall score indicating a degree of overlap between a first installation period associated with the first application on a plurality of computing devices and a second installation period associated with the second application on the plurality of computing devices; and
    providing the one or more applications of interest for display.

16. A computer-implemented method comprising:
    receiving a user selection of a particular application of a plurality of applications;
    retrieving one or more applications of interest based on the particular application using an index, the index associating, for each first application and second application of an application pair of the plurality of applications, the second application as an application of interest in view of the first application when an overall score corresponding to the application pair is greater than or equal to a threshold score, the overall score indicating a degree of overlap between a first installation period associated with the first application on a plurality of computing devices and a second installation period associated with the second application on the plurality of computing devices; and providing the one or more applications of interest for display.

17. The computer-implemented method of claim 16, wherein the overall score is based on a total user score across a plurality of users.

18. The computer-implemented method of claim 17, wherein the overall score is based on a probability that is based on the total user score and a popularity of the second application.

19. The computer-implemented method of claim 18, wherein the popularity of the second application is based on a number of installations of the second application on the plurality of computing devices.

20. The computer-implemented method of claim 17, further comprising:

determining a group of users that installed both the first application and the second application;

for each user in the group of users, calculating a per-user score to provide a plurality of per-user scores; and calculating the total user score as a sum of the plurality of per-user scores.

* * * * *

UNITED STATES PATENT AND TRADEMARK OFFICE
CERTIFICATE OF CORRECTION

PATENT NO. : 8,484,636 B2  
APPLICATION NO. : 13/530204  
DATED : July 9, 2013  
INVENTOR(S) : Bhaskar Mehta et al.

Page 1 of 1

It is certified that error appears in the above-identified patent and that said Letters Patent is hereby corrected as shown below:

Title Page, column 2 (Assistant Examiner), delete "Larry Ung" and insert -- Lanny Ung --, therefor.

In the claims

Column 19, line 3, in Claim 3, after "system of" insert -- claim --.

Signed and Sealed this  
Twenty-fourth Day of September, 2013

Teresa Stanek Rea  
*Deputy Director of the United States Patent and Trademark Office*